US012789653B2

(12) United States Patent
Beierl

(10) Patent No.: US 12,789,653 B2
(45) Date of Patent: Nov. 10, 2026

(54) CHARGING CONNECTION

(71) Applicant: Dr. Ing. h.c. F. Porsche Aktiengesellschaft, Stuttgart (DE)

(72) Inventor: Dominik Beierl, uml u+ee nchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 288 days.

(21) Appl. No.: 18/665,618

(22) Filed: May 16, 2024

(65) Prior Publication Data

US 2025/0001882 A1 Jan. 2, 2025

(30) Foreign Application Priority Data

Jun. 28, 2023 (DE) .................... 10 2023 117 033.3

(51) Int. Cl.
*B60L 53/16* (2019.01)
*E05D 11/00* (2006.01)
(Continued)

(52) U.S. Cl.
CPC .......... *B60L 53/16* (2019.02); *E05D 11/0081* (2013.01); *E05F 15/00* (2013.01);
(Continued)

(58) Field of Classification Search
CPC .... H01R 2201/26; H01R 13/447–4538; H01R 13/629; H01R 13/5213; B60L 53/16
(Continued)

(56) References Cited

U.S. PATENT DOCUMENTS 3,992,070 A * 11/1976 Dunn .................... E02F 9/2004 292/DIG. 19
5,413,493 A * 5/1995 Hoffman ................. B60L 53/11 200/51.09
(Continued)

FOREIGN PATENT DOCUMENTS

DE 102006050708 A1 5/2008
DE 102010053137 A1 6/2012
(Continued)

OTHER PUBLICATIONS

Examination Notice with machine translation mailed on Feb. 14, 2024 by the German Patent and Trademark Office in corresponding German Patent Application No. 102023117033.3. (12 pages).

*Primary Examiner* — Christopher M Koehler
*Assistant Examiner* — Gregory L Mangot
(74) *Attorney, Agent, or Firm* — Buchanan Ingersoll & Rooney PC

(57) ABSTRACT

A charging connection having a charging socket and a charging socket cover, which is arranged in a motor vehicle such that the charging socket cover covers an opening in the vehicle body in a first operating position and the charging socket is arranged in the first operating position behind the charging socket cover. The charging socket cover releases the opening in a second operating position and is arranged behind the opening in a free space of the body. The charging socket is arranged in the second operating position adjacent to the opening, to be available for a charging cable plug to be connected. The charging socket and the charging socket cover are displaceable between the first operating position and the second operating position. The charging socket is electrically connected by way of at least one lever transmission.

11 Claims, 1 Drawing Sheet

(51) Int. Cl.
*E05F 15/00* (2015.01)
*H01R 13/52* (2006.01)

(52) U.S. Cl.
CPC ... *E05Y 2201/626* (2013.01); *E05Y 2900/534* (2013.01); *H01R 13/5213* (2013.01)

(58) Field of Classification Search
USPC .......................................... 439/131, 135, 136
See application file for complete search history.

(56) References Cited

U.S. PATENT DOCUMENTS

| | | | | |
|---|---|---|---|---|
| 8,721,354 | B2 * | 5/2014 | Liao ................... | H01R 13/4534 439/131 |
| 9,193,270 | B2 | 11/2015 | Tanneberger et al. | |
| 2013/0023135 | A1 * | 1/2013 | Nakamura ........... | H01R 13/447 439/153 |
| 2013/0271079 | A1 | 10/2013 | Idczak et al. | |
| 2022/0203850 | A1 * | 6/2022 | Galland .................. | B60L 53/16 |
| 2024/0110427 | A1 * | 4/2024 | Göpfert .................. | B60K 15/05 |

FOREIGN PATENT DOCUMENTS

| | | | |
|---|---|---|---|
| DE | 102012022101 | A1 | 5/2013 |
| DE | 102012020710 | A1 | 4/2014 |
| DE | 102021123487 | A1 | 3/2023 |
| WO | 2011104422 | A1 | 9/2011 |

* cited by examiner

CHARGING CONNECTION

CROSS-REFERENCE TO RELATED APPLICATION

This application claims priority to German Patent Application No. 10 2023 117 033.3, filed Jun. 28, 2023, the content of such application being incorporated by reference herein in its entirety.

FIELD OF THE INVENTION

The invention relates to a charging connection, in particular for an electrically driven motor vehicle.

BACKGROUND OF THE INVENTION

Electrically driven motor vehicles with a purely electric drive or as a plug-in hybrid typically require a charging connection to connect a charging cable for charging the vehicle battery from a charging network to recharge the vehicle battery. To this end, the motor vehicle comprises a charging connection with a charging socket that is concealed behind a charging socket cover. After opening the charging socket cover, the charging socket is accessible for connecting a charging cable. The arrangement of the charging socket and the charging socket cover in the motor vehicle is provided such that the charging socket cover is arranged as inconspicuously as possible on the outer skin of the motor vehicle, so that an overall flat impression is created and at the same time the charging socket is arranged behind the charging socket cover such that it is protected behind the charging socket cover and is ergonomically easily accessible to the user if necessary. The charging socket must be designed to be displaceable accordingly.

It is also essential that the charging socket be electrically connected appropriately even if displaceability is required, in order to allow the high currents needed to charge a vehicle without any problems. Flexible cables are less suitable for this purpose, because they cause problems with the flexible strands of the flexible cable over their service life and require more installation space due to the increased cross-section required.

DE 10 2012 020 710 A1, which is incorporated by reference herein, discloses a charging connection with a charging socket and with a cover for the charging socket, wherein the charging socket and the cover can be pivoted together about an axis, so that when the cover is rotated about an axis, the charging socket is also rotated about the axis. The cover is at a right angle to the charging socket, which is connected to the cover. As a result, the cover can be adapted to the size of the charging socket, such that the charging socket is easily accessible and ergonomically arranged after pivoting the cover.

DE 10 2020 053 137 A1, which is incorporated by reference herein, discloses a charging connection with a linearly displaceable charging socket and a charging socket cover that can be pivoted in front of it, wherein the charging socket cover pulls out the charging socket in an elongated receptacle when it is pivoted. The charging socket is connected to an internal flexible cable, which is moved with the charging socket. This is rather problematic at high currents, as the flexible cable is also subject to a certain amount of wear in continuous operation due to its frequent displacements.

SUMMARY OF THE INVENTION

Described herein is a charging connection with a charging socket and charging socket cover that allows the charging socket cover to be moved when closed, provides a charging socket that is ergonomically easily accessible when open, and at the same time allows a reliable electrical connection to the charging socket even if the charging socket can be displaced.

An example embodiment of the invention relates to a charging connection having a charging socket and a charging socket cover, which is arranged in a motor vehicle such that the charging socket cover covers an opening in the vehicle body in a first operating position and the charging socket is arranged behind the charging socket cover in the first operating position, wherein the charging socket cover releases the opening in a second operating position and is arranged behind the opening in a free space of the body, wherein the charging socket is arranged in the second operating position adjacent to the opening in order to be available for a charging cable plug to be connected, wherein the charging socket and the charging socket cover can be displaced between the first operating position and the second operating position, wherein the charging socket is electrically connected by means of at least a first lever transmission. As a result, the charging socket can be connected with a reliable displaceability to a reliable electrical connection over its service life and also allows high currents under high voltage conditions, i.e. a high-volt connection with high currents can also be achieved.

In one example embodiment, it is particularly advantageous if the at least one first lever transmission is a two-stroke device comprising two levers that are coupled to each other as a hinge in a v-shaped manner. This creates a rather straightforward lever transmission that also requires only a few components and yet functions reliably and serves to electrically connect the charging socket to a supply line. The supply line can be configured as a rigid line that is connected to the first lever transmission, which has advantages in terms of the required installation space and a low weight with good electrical conductivity.

It is also expedient if the at least one first lever transmission comprises a fixed bearing and a displaceable bearing, wherein a first lever of the two levers is hinged at a first of its ends at the fixed bearing and the second lever of the two levers is hinged at a first of its ends at the displaceable bearing, wherein the levers are hinged together at their respective second end. The charging socket is advantageously fixedly connected to the displaceable bearing, for example via a frame, a bracket and/or a housing, and thus the electrical connection of the charging socket to the displaceable bearing is formed. As a result, a reliable electrical connection can be achieved with the desired displaceability of the charging socket.

It is also advantageous if the charging socket is hinged to the displaceable bearing. This mounting can be achieved by means of a frame, a bracket and/or a housing, for example. This makes possible a simple yet reliable electrical contacting.

It is advantageous if the at least one fixed bearing of the at least one lever transmission is electrically connected to a voltage source via an electrical connection. Thus, a reliable permanent electrical connection from the voltage source to the charging socket can be achieved via the lever transmission, wherein the connection of the fixed bearing also enables a rigid electrical connection, in particular with a rigid cable without the need for a flexible cable.

It is also advantageous if the electrical connection is a rigid and/or fixed, in particular rod-shaped, line. This allows for large cross-sections and is permanently more stable compared to flexible lines, such as cable connections.

It is also advantageous if the displaceable bearing is displaceably guided by means of a guide. The movement is thus clearly defined and designed to be reproducible.

It is also particularly advantageous if the charging socket is displaceably mounted by means of at least one driving mechanism and/or by means of at least one second lever transmission. The displaceability of the charging socket can thus be dependably and reliably initiated and guided over its service life. As a result, the charging socket can be arranged behind the charging socket cover in the first operating position and the charging socket can be arranged adjacent to the opening in the second operating position in order to be available for a charging cable plug to be connected.

It is also particularly advantageous if the charging socket cover is displaceably mounted by means of at least one driving mechanism and/or by means of at least one third lever transmission. This allows the charging socket cover to be driven accordingly and the displacement to be guided in order to close or release the opening.

In a further example embodiment, it is expedient for the charging socket cover to be displaceably hinged to the charging socket or to the body, for example by means of the third lever transmission. As a result, for example, the displacement of the charging socket can also at least partially accompany the displacement of the charging socket cover, whereby the movements can also be coupled to each other, for example, or can occur independently of each other. For example, the charging socket cover can only be displaced when the charging socket has been moved back to free up the necessary installation space for the charging socket cover.

Also, it is expedient if the charging socket cover is arranged in the first operating position in front of the charging socket and the charging socket cover is arranged to the side of the charging socket in the second operating position. Thus, less installation space is required in terms of the depth, because the charging socket cover is to the side of the charging socket and not behind it.

BRIEF DESCRIPTION OF THE DRAWINGS

The invention is described in detail in the following on the basis of an example embodiment with reference to the drawings. The drawings show.

DETAILED DESCRIPTION OF THE INVENTION

Figure 1:
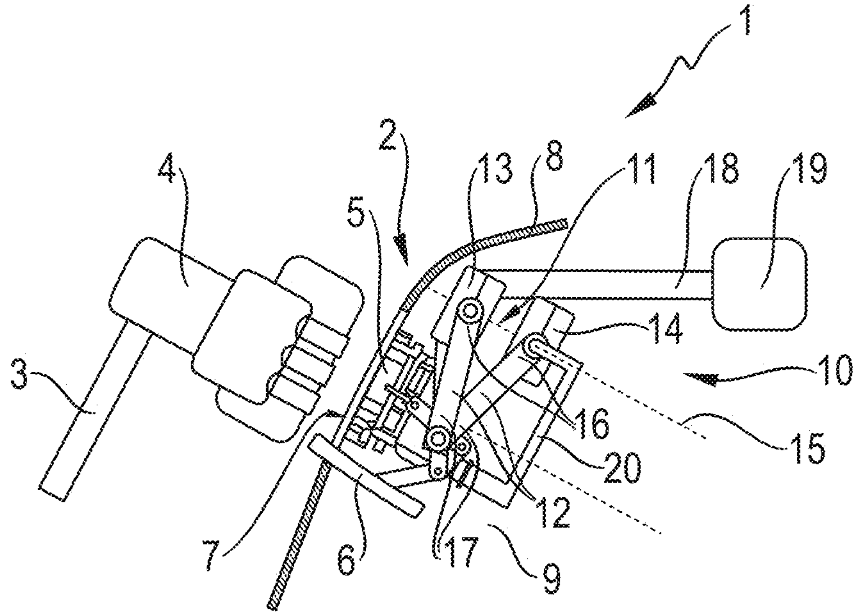
FIG. 1 a schematic cross-sectional diagram of an example embodiment of a charging connection of a motor vehicle when in an opened state.

FIG. 1 shows a partial illustration of a motor vehicle 1 with a charging connection 2 for connecting a charging cable 3 with a charging cable plug 4, for example for charging a vehicle battery via a charging network.

Figure 2:
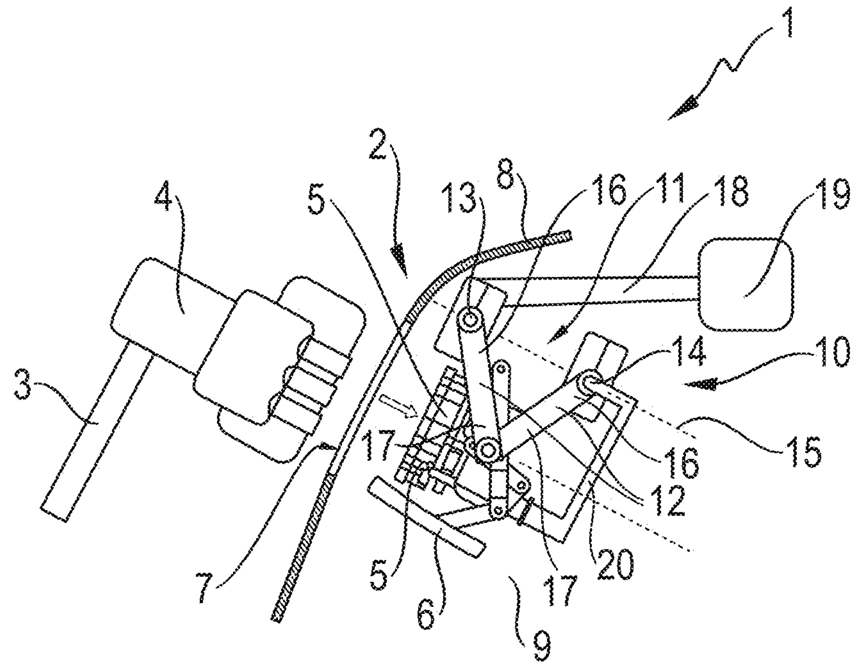
FIG. 2 is a schematic cross-sectional diagram of the charging connection of the motor vehicle in the transition between the opened state and a closed state.

FIGS. 1 and 2 show a schematic cross-sectional diagram of the charging connection 2 of the motor vehicle 1, respectively. FIG. 1 shows the charging connection 2 in the opened state and FIG. 2 shows the charging connection 2 of the motor vehicle 1 in the transition from the opened state to the closed state.

The charging connection 2 is configured with a charging socket 5 and with a charging socket cover 6. The charging connection 2 is arranged in the motor vehicle 1 such that the charging socket cover 6 covers and closes an opening 7 in the vehicle body 8 in a first operating position and the charging socket 5 is arranged in the first operating position shielded behind the charging socket cover 6. In this first operating position, the charging socket 5 is not available for connection to the charging cable plug 4; the charging connection 2 is in a closed state.

In a second operating position, the charging socket cover 6 releases the opening 7 and is arranged behind the opening 7 in a free space 9 of the body 8, for example adjacent to the charging socket 5, as shown in FIG. 1. In the second operating position, the charging socket 5 is arranged adjacent to the opening 7 in order to be available for a charging cable plug 4 to be connected. For this purpose, the charging socket 5 is displaced forward towards the opening 7.

To achieve this, the charging socket 5 and the charging socket cover 6 are displaceably arranged or mounted between the first operating position and the second operating position.

As can be seen in FIGS. 1 and 2, the charging socket 5 is electrically connected by means of at least a first lever transmission 10. For example, such a first lever transmission 10 is arranged on one side of the charging socket 5, or alternatively, such a first lever transmission 10 can also be arranged on both sides of the charging socket 5. The first lever transmission 10 is used to electrically connect the charging socket 5 to the vehicle battery to be able to power and charge it from a charging network.

It is not shown in FIGS. 1 and 2 that the charging socket 5 is displaceably mounted by means of at least one driving mechanism and/or by means of at least a second lever transmission or another transmission and/or actuator.

It is also not shown that the charging socket 6 is displaceably mounted by means of at least one driving mechanism and/or by means of at least a third lever transmission or another transmission and/or actuator. This allows the charging socket cover 6 to be arranged in the first operating position in front of the charging socket 5 and the charging socket cover 6 to be arranged to the side of the charging socket 6 in the second operating position.

In the example embodiment shown, the at least one first lever transmission 10 is a two-stroke device 11 comprising two levers 12 that are coupled to each other as a hinge in a v-shaped manner.

The at least one first lever transmission 10 has a fixed bearing 13 and a displaceable bearing 14, wherein the fixed bearing 13 is arranged fixed to the body and the displaceable bearing 14 is guided by means of a guide 15, for example. The guide 15 is configured as a linear guide, for example, or as a curved guide 15. The guide 15 is preferably also arranged so that it is fixed to the body. Alternatively, the guide 15 can also be dispensed with. The displaceable bearing 14 is fixedly connected to the charging socket 5, wherein the electrical connection between the charging socket 5 and the displaceable bearing 14 is made via the connection 20, which is configured as a bracket, for example.

The two-stroke device 11 with its two levers 12 is configured such that the levers 12 that are coupled to each other as a hinge in a v-shaped manner are hinged to the bearings 13, 14, wherein there is a hinged connection between the two levers 12. A first lever 12 of the two levers 12 is hinged at a first of end 16 of its ends 16, 17 at the fixed bearing 13 and the second lever 12 of the two levers 12 is hinged at a first end 16 of its ends 16, 17 at the displaceable bearing 14, wherein the levers 12 are hinged together at their respective second end 17.

Furthermore, it can be seen in FIGS. 1 and 2 that the at least one fixed bearing 13 of the at least one lever transmission 10 or at least one fixed bearing 13 of a lever transmission 10 is electrically connected to a voltage source 19 via an electrical connection 18. Thus, the electrical supply and mechanical displaceability of the charging socket 5 can be achieved by means of the lever transmission 10.

It is advantageous if the electrical connection 18 is a rigid, fixed, in particular rod-shaped, line. The line cross-section can be about 150 $mm^2$ to 200 $mm^2$ or more. Thus, high current levels can be used to perform a charging operation.

What is claimed is:

1. A charging connection comprising:

a charging socket; and a charging socket cover arranged in a motor vehicle and moveable between a first operating position and a second operating position, wherein, in the first operating position, the charging socket cover covers an opening in the vehicle body and the charging socket is arranged behind the charging socket cover, wherein, in the second operating position, the charging socket cover releases the opening and is arranged behind the opening in a free space of the body, wherein, in the second operating position, the charging socket is arranged adjacent to the opening in order to be available for a charging cable plug to be connected, wherein the charging socket and the charging socket cover are configured to be displaced between the first operating position and the second operating position, wherein the charging socket is electrically connected by way of at least a first lever transmission.

2. The charging connection according to claim 1, wherein the charging socket is displaceably mounted by way of at least one driving mechanism and/or by way of at least a second lever transmission.

3. The charging connection according to claim 1, wherein the charging socket cover is displaceably mounted by way of at least one driving mechanism and/or by way of at least a third lever transmission.

4. The charging connection according to claim 1, wherein the charging socket cover is arranged in the first operating position in front of the charging socket and the charging socket cover is arranged to the side of the charging socket in the second operating position.

5. A motor vehicle comprising the charging connection of claim 1.

6. The charging connection according to claim 1, wherein the first lever transmission is a two-stroke device, which has two levers that are coupled to each other as a hinge in v-shaped manner.

7. The charging connection according to claim 6, wherein the first lever transmission comprises a fixed bearing and a displaceable bearing, wherein a first end of a first lever of the two levers is hinged at the fixed bearing and a first end of a second lever of the two levers is hinged at the displaceable bearing, wherein the levers are hinged together at respective second ends.

8. The charging connection according to claim 7, wherein the charging socket is hinged to the displaceable bearing.

9. The charging connection according to claim 7, wherein the displaceable bearing is displaceably guided by way of a guide.

10. The charging connection according to claim 7, wherein the fixed bearing of the first lever transmission is electrically connected to a voltage source via an electrical connection.

11. The charging connection according to claim 10, wherein the electrical connection is a rigid and/or fixed rod-shaped line.

* * * * *